(12) United States Patent
Bousfield et al.

(10) Patent No.: US 9,734,366 B2
(45) Date of Patent: Aug. 15, 2017

(54) TAMPER CREDENTIAL

(71) Applicant: ASSA ABLOY AB, Stockholm (SE)

(72) Inventors: Randall Dennis Bousfield, Arvada, CO (US); Sylvain Jacques Prevost, Austin, TX (US); Michael Lawrence Davis, Austin, TX (US); David Edward Andresky, Lafayette, CO (US); Toby Mark Padilla, Lakewood, CO (US)

(73) Assignee: ASSA ABLOY AB (SE)

( * ) Notice: Subject to any disclaimer, the term of this patent is extended or adjusted under 35 U.S.C. 154(b) by 0 days.

(21) Appl. No.: 14/772,901

(22) PCT Filed: Mar. 14, 2014

(86) PCT No.: PCT/IB2014/001190
§ 371 (c)(1),
(2) Date: Sep. 4, 2015

(87) PCT Pub. No.: WO2014/140917
PCT Pub. Date: Sep. 18, 2014

(65) Prior Publication Data
US 2016/0026836 A1  Jan. 28, 2016

Related U.S. Application Data

(60) Provisional application No. 61/792,432, filed on Mar. 15, 2013.

(51) Int. Cl.
*H04Q 5/22* (2006.01)
*G06K 7/10* (2006.01)
(Continued)

(52) U.S. Cl.
CPC ..... *G06K 7/10267* (2013.01); *G06K 7/10257* (2013.01); *G06K 19/07798* (2013.01); *G07C 9/00031* (2013.01); *G07C 9/00119* (2013.01)

(58) Field of Classification Search
CPC .................................................. G06K 7/10267
(Continued)

(56) References Cited

U.S. PATENT DOCUMENTS 6,265,973 B1 * 7/2001 Brammall ............. B65D 90/00
340/539.1
2003/0011474 A1  1/2003 Ng
(Continued)

FOREIGN PATENT DOCUMENTS

EP  0924655  6/1999
GB  2446178  8/2008

OTHER PUBLICATIONS

International Search Report and Written Opinion for International (PCT) Patent Application No. PCT/IB2011114/001190, mailed Oct. 9, 2014, pp. 11.
(Continued)

*Primary Examiner* — Santiago Garcia
(74) *Attorney, Agent, or Firm* — Sheridan Ross P.C.

(57) ABSTRACT

Readers are associated with a number of access credentials and, once authenticated by the reader, may grant the holder of the access credential access to a secured asset. Readers may become the target of attack, such as when an unauthorized party attempts to gain access to the interior of the reader or removes the reader from an installed location. Once removed the reader may be reinstalled in another location or a counterfeit reader used in its place. By providing a paired tamper credential, the reader may deny otherwise authorized access to the secured asset if the tamper credential fails to respond appropriately. The tamper credential may fail to respond due to distance, such as when the reader alone is relocated, or the tamper credential is damaged, such as during an attempt to gain access the interior of the reader and/or remove the reader from its installed location.

20 Claims, 5 Drawing Sheets

(51) Int. Cl.
*G07C 9/00* (2006.01)
*G06K 19/077* (2006.01)

(58) Field of Classification Search
USPC .......................................................... 340/10.1
See application file for complete search history.

(56) References Cited

U.S. PATENT DOCUMENTS

| | | | | |
|---|---|---|---|---|
| 2003/0074936 A1* | 4/2003 | Conforti | ............ | G07C 9/00103 70/277 |
| 2006/0261959 A1* | 11/2006 | Worthy | .............. | G08B 13/1445 340/572.8 |
| 2008/0271145 A1* | 10/2008 | Schiller | ................... | G06F 21/86 726/23 |
| 2008/0290994 A1* | 11/2008 | Bruns | ................. | H04L 63/0428 340/10.1 |
| 2010/0327060 A1* | 12/2010 | Moran | ................. | G06K 7/0004 235/440 |
| 2011/0068921 A1* | 3/2011 | Shafer | ................... | G06K 7/0008 340/571 |
| 2012/0032834 A1* | 2/2012 | Weeks | .................... | G01S 7/003 342/118 |
| 2012/0104097 A1* | 5/2012 | Moran | ................. | G06K 7/0004 235/449 |
| 2013/0033364 A1* | 2/2013 | Raz | .................... | G06K 19/0716 340/10.1 |
| 2013/0135104 A1* | 5/2013 | Nikkanen | ........ | G06K 19/07372 340/572.1 |
| 2014/0181524 A1* | 6/2014 | Itoh | ....................... | H04L 9/3273 713/174 |

OTHER PUBLICATIONS

International Preliminary Report on Patentability for International (PCT) Patent Application No. PCT/IB2011114/001190, mailed Sep. 24, 2014, pp. 8.

* cited by examiner

TAMPER CREDENTIAL

CROSS REFERENCE TO RELATED APPLICATION

This application is a national stage application under 35 U.S.C. 371 of PCT Application No. PCT/IB2014/001190 having an international filing date of Mar. 14, 2014, which designated the United States, which PCT application claimed the benefit of U.S. Application Ser. No. 61/792,432, filed Mar. 15, 2013, both of which are incorporated by reference in their entirety.

FIELD OF THE DISCLOSURE

The present disclosure is generally directed toward radio frequency identification (RFID) tamper tags.

BACKGROUND

RF Identification (RFID) is currently the dominate technology in physical access control systems. Consequently, there is a huge global legacy of installed access control readers that use RFID. The same RFID standards are used for other applications such as transport, luggage identification, ticketing, payment according to the Contactless EMV standard (Europay, MasterCard, Visa), and more.

Generally, a RFID reader (or simply, a "reader") is presented with an access credential. The reader then authenticates the access credential, alone or with additional user input (e.g., password, PIN, biometric data, etc.). If successfully authenticated, the reader causes a signal to be sent to an access controller, such as to a door lock, and thereby allow the access credential holder to gain access to a secured asset protected by the access controller, such as a room, building, equipment, etc.

Readers and access credentials are subject to a variety of attacks. Attacks may be as crude as physically attacking in an attempt to damage or open the reader, or more sophisticated attacks, such as whereby signals are created in an attempt to mimic the signal of an authenticated access credential.

Often readers in a single installation may appear very similar, or even identical, in outward appearance. A bad actor may attempt to remove a legitimate reader. The interior of the legitimate reader may be altered or replaced in an attempt to gain knowledge associated with presented access credentials. In certain environments a bad actor may have legitimate access privileges to one area but not to another. The bad actor may attempt to switch the readers in an attempt to gain access to the unauthorized area. If the physical appearance of the readers is sufficiently similar, personnel may be unaware that the readers have been swapped.

SUMMARY

It is with respect to the above issues and other problems that the embodiments presented herein were contemplated.

Tamper credentials may be embodied as an adhesive tag, such as Mifare, iClass, or physically unclonable function ("PUF") tags. Other form factors such as cards, key fobs, etc. which also include a tamper mechanism. In certain embodiments disclosed herein, a tamper credential is paired with a reader. Removing or damaging (e.g., partial removal) the tamper credential may indicate via sight, sound, or smell, the tampering via a mechanical and/or chemical indicator. In addition, the reader and tamper credential may maintain a normal state of operation when each is able to perform their portion of a tamper authentication protocol. Damage to the reader or tamper credential, or separation thereof, would then cause the tamper authentication to fail and cause at least the reader to switch to a tamper state. A bad actor attempting to restart the tamper authentication protocol, such as by bringing the separated reader and tamper credential back into proximity with each other, or by providing a replacement tamper credential, would be unable to restart the tamper authentication protocol without the intervention of authorized personnel and/or equipment.

In one embodiment, a system is disclosed, comprising: a reader; a tamper credential; a first communication interface comprising transmission and reception components of the reader and the tamper credential that facilitates communication between the reader and the tamper credential, wherein the tamper credential is paired to the reader at least by having an indicia of the tamper credential maintained in a memory of the reader, the reader and tamper credential being operable to communicate when the reader and tamper credential are within a predetermined distance of one another; a processor operable to place the reader in a tamper state upon a failure to communicate with the reader, In another embodiment, a method is disclosed, comprising: operating a reader and a tamper credential in proximity to each other such that, once the reader is powered, each of the reader and tamper credential are operable to communicate with the other; powering the reader; upon powering the reader, cause the reader to transmit a first signal to the tamper credential, the first signal comprising at least a transmitted indicia of the reader; and operating the reader in a tamper state upon the failure of at least one of a number of steps in a tamper authentication protocol, the tamper authentication protocol comprising: receiving the first signal by the tamper credential; accessing, by the tamper credential, an indicia of the reader maintained in a memory of the tamper credential; determining, by the tamper credential, the first signal includes the transmitted indicia of the reader in accord with the indicia of the reader maintained in the memory of the tamper credential; transmitting, by the tamper credential, a second signal to the reader, the second signal comprising at least a transmitted indicia of the tamper credential; upon receiving the second signal, processing, accessing a stored indicia of the tamper credential maintained in a memory of the reader; and determining, by the reader, the second signal includes the transmitted indicia of the tamper credential in accord with the indicia of the tamper credential maintained in the memory.

In still another embodiment, an apparatus is disclosed, comprising: a processor; a memory; a first transmitter; a first receiver; and wherein the memory includes an indicia of a tamper credential maintained in the memory; wherein the processor is operable to cause the first transmitter to transmit a first signal; wherein the receiver is operable to receive a second signal; wherein the processor is operable to determine whether the received second signal comprises a received indicia of a tamper credential in accord with the indicia of the tamper credential maintained in the memory; and wherein the processor is configured to operate the apparatus in a tampered state upon at least one of the failure of the first receiver to receive the second signal upon the first transmitter transmitting the first signal and upon the processor failing to determine the received second signal includes the received indicia of the tamper credential in accord with the indicia of the tamper credential maintained in the memory.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

The identification in the description of element numbers without a subelement identifier, when a subelement identifiers exist in the figures, when used in the plural, is intended to reference any two or more elements with a like element number. A similar usage in the singular, is intended to reference any one of the elements with the like element number. Any explicit usage to the contrary or further qualification shall take precedence.

The exemplary systems and methods of this disclosure will also be described in relation to analysis software, modules, and associated analysis hardware. However, to avoid unnecessarily obscuring the present disclosure, the following description omits well-known structures, components and devices that may be shown in block diagram form, and are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
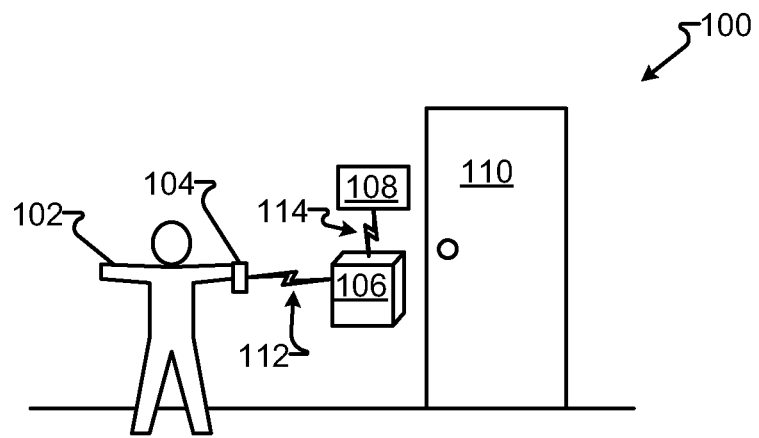
FIG. 1 depicts a system for controlling access to an asset in accordance with embodiments of the present disclosure.

With reference now to FIG. 1, system 100 will be described for controlling access to an asset in accordance with embodiments of the present disclosure. In one embodiment, person 102 having access credential 104, presents access credential 104 to reader 106 whereby data is exchanged via communication interface 112. Reader 106 determines, alone or in conjunction with other systems (not shown), if access credential 104 is authorized to access secure asset, such as an area controlled by door 110. Reader 106 validates itself, in part, by exchanging data via communication 108, with tamper credential 108.

Access credential 104, communication interface 112, and portions of reader 106 may be variously embodied such as to facilitate communication interface 112 via contact and/or non-contact means. Non-contact means of operating communication interface 112 include, without limitation, optical (e.g., portions of the visible and invisible electromagnetic spectrum), audible, and RF communications (e.g., using 125 KHz or 13.56 MHz bands, UHF bands, etc.). You should note that the communication interface 112 may also be Bluetooth, BLE, ZigBee, WiFi (through a separate router), etc. Contact means may incorporate magnetic card reader, biometric readers, keypads, or other devices as may be known in the art. Communication interface 114 may be embodied in a form such as to reduce interference with communication interface 112 or other operation of reader 106. In one embodiment, communication interface 112 may performed via conductors, such as fine wires, structures, or other conductive paths which may be calculated to become inoperable if subjected to tampering. The interfaces 112, 114 may also be operated at different non-interfering frequencies.

Reader 106 and tamper credential 108 provide an additional authentication procedure whereby the absence of a signal from one may cause the other to operate in or switch to a tamper state. In a further embodiment, reader 106 and tamper credential 108 are paired such that the absence of a unique one may cause the unique other to operate in a tamper state. Tamper credential 108 may deemed absent if it is unable to do any one or more of: receive a signal from reader 106, authenticate the signal, formulate a reply signal, send the reply signal back to reader 106, and have the reply signal authenticated. Tamper credential 108 may be unable to perform such operations if move outside of the operational distance of communication interface 114 or if damaged.

In another embodiment, reader 106 may be paired with a plurality of tamper credentials 108, whereby the absence of a signal from any one of the tamper credentials 108 causes the processor to operate in a tamper state. As a benefit, reader 106 may be made more secure. For example, one tamper credential 108 may be placed on the internal housing of reader 106, such as a seam or weakened area. An attempt to open the housing of reader 106 may then damage one internal tamper credential 108 to render it inoperable and thus cause the processor to be in a tamper state. Reader 106 may be mounted on the insecure side of a wall and a bad actor may simply try to remove reader 106 in its entirety. Doing so may then make a second tamper credential 108 absent to reader 106. In one embodiment, tamper credential 108 is mounted on the secure side of a wall but in communication interface 114 with reader 106, such as when the wall is of a structure and/or material to permit communication interface 114 (e.g., RF). As a result of having two tamper credentials 108 paired to reader 106, additional tamper protection may be provided. As can be appreciated, the addition of more tamper credentials 108 may be provided to further enhance tamper protection, such as on a plurality of the interior, exterior, wired, wireless, embedded within a mounting surface, or other configurations.

Placing reader 106 and/or tamper credential 108 in a tamper state may occur within a single failure of one to communicate with the other. In another embodiment, a certain number of failures are permitted before the tamper state is set. For example, lightening or other electromagnetic discharges may cause a brief failure of communication interface 114. However, if communication interface 114 is restored, and otherwise authenticated, reader 106 and/or tamper credential 108 may continue to operate in a normal state.

Operating reader 106 in a tamper state is variously embodied. In one embodiment, tamper state disables reader 106 whereby reader 106 is "bricked" and entirely inoperable. In another embodiment, certain features of reader 106 are enabled or disabled. For example, tamper state may cause reader 106 to send an alarm signal (e.g., reporting signal, visual alarm, audible alarm, etc.). In another example, certain personnel, such as those associated with a different category of access credentials 104, may still be authenticated by reader 106. For example, reader 106 that is operating in a tamper state may deny workers (i.e., individuals with normal work duties associated with having access to a secured asset controlled by reader 106) access to a secure asset, but allow security personnel to be granted access. In yet another embodiment, tamper state may operate a silent alarm function, whereby reader 106 may authenticates access credentials 104 normally, allow access which would normally be denied, deny accesses, perform no apparent action, or other function, however, reader 106 may issue a reporting signals to notify systems and/or personnel, such as may enable catching a bad actor "red handed."

Figure 2:
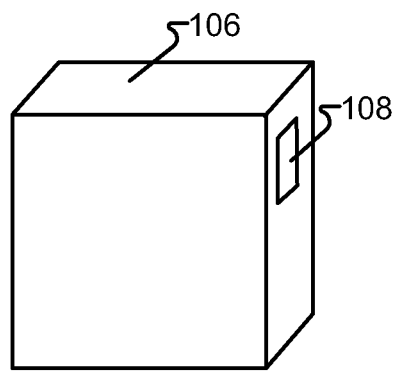
FIG. 2 illustrates a tamper credential being physically attached to a reader in accordance with embodiments of the present disclosure.

With reference now to FIG. 2, a tamper credential 108 in accordance with embodiments of the present disclosure will be described. Tamper credential may be physically attached to reader 106. In one embodiment, such as, that illustrated by FIG. 2, tamper credential 108 is attached to exterior of reader 106. In such an embodiment, a bad actor may attempt to replace the internal components of reader 106 but be thwarted as the pairing associated with reader 106 and tamper credential 108 would no longer agree.

In other embodiments, the physical structure and/or placement of tamper credential 108 is calculated to disable tamper credential 108 upon an unauthorized access of reader 106. In one embodiment, tamper credential 108 is placed on a seam or weakened area in or on the housing of reader 106. In such an embodiment, an attempt gain access to the interior of reader 106 is calculated to cause damage, and thereby disable, tamper credential 108. In another embodiment, tamper credential 108 may be placed over a screw, locking tab, or other structural joint calculated to require the removal and/or damage and subsequent disabling of tamper credential 108 to open the structural joint.

In yet another embodiment, reader 106 may be mounted to a surface (e.g., portion of a wall, post, cabinet, door, etc.) directly, or via mounting hardware, in a manner design to resist unauthorized removal therefrom. The placement and/or design of tamper credential 108 being selected to cause tamper credential 108 to be disabled upon being subject to a tampering event, such as the removal or partial removal of reader 106 from the surface, or removal of the mounting frame from the surface.

Figure 3:
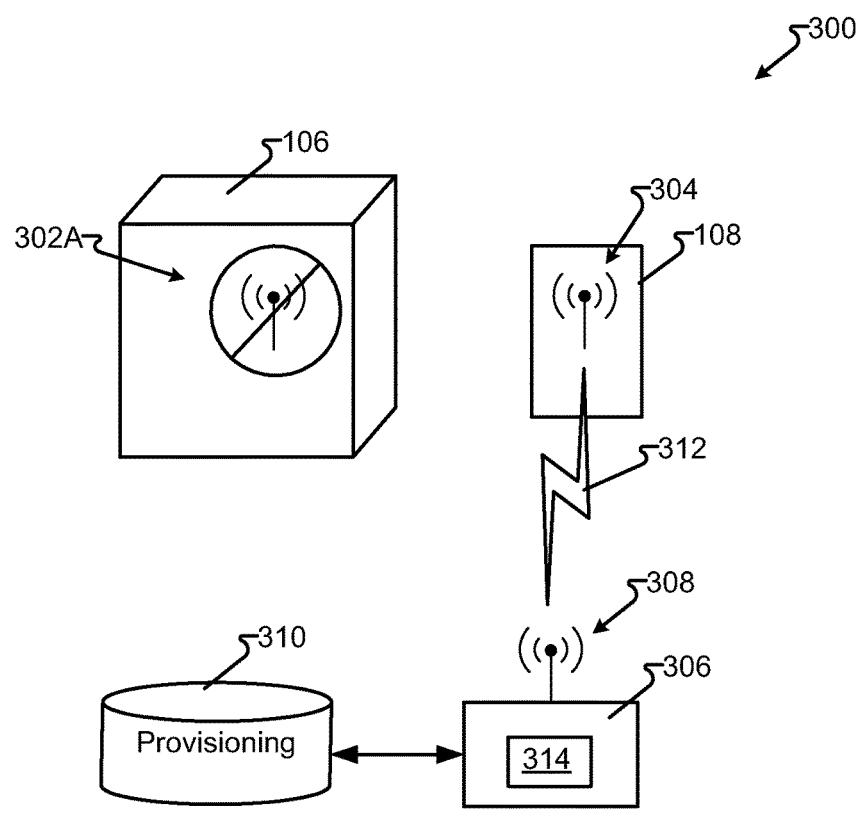
FIG. 3 illustrates provisioning system whereby a tamper credential is provided with a provisioning payload to provision a reader in accordance with embodiments of the present disclosure.

With reference now to FIG. 3, provisioning system 300 will be described in accordance with embodiments of the present disclosure. In certain embodiments described herein, reader 106 receives power from a power supply (e.g., wall outlet, photovoltaic cells, charged batteries, etc.) and once installed, provides power to tamper credential 108, such as via an inductive loop, conductive wires, or other means. In certain stages of manufacturing of reader 106 and tamper credential 108, such as once packaged, reader 106 is inoperable as it lacks a suitable power supply. However, tamper credential 108 may incorporate an inductive loop whereby a signal, which readily passes through most packing materials, may be applied to power tamper credential 108. As a benefit, tamper credential 108 may be provisioned (e.g., loaded with data and/or instructions so as to enable operations) at nearly any point after manufacture, including after packaging. As a further benefit, tamper credential 108 may be provisioned at nearly any point prior to installation at a site without requiring unpacking.

In another embodiment, reader 106 incorporates disabled antenna 302A. Disabled antenna 302A may be an otherwise operational antenna except for lacking a connection to a suitable power supply. Disabled antenna 302 may be disabled for other reasons, such as when reader 106 has not completed the manufacturing process. However, as tamper credential 108 and reader 106 are, or will become, paired, certain efficiencies may be realized by packaging both the reader 106 and tamper credential 108 within the same packaging. Furthermore, as described with respect to certain embodiments herein, tamper credential 108 may be manufactured within or physically attached to reader 106.

In a further embodiment, reader 106 is packaged with tamper credential 108. Disabled antenna 302A is inoperable. Credential antenna 304 is operable if provided a suitable signal. Computer 306 accesses stored providing data in provisioning database 310, such as to include encryption methodologies, serial numbers, public and/or private keys, customer configuration data, pairing data, and/or other data to provision reader 106 and/or tamper credential 108. Computer 306 causes antenna 308 to communicate 312 with tamper credential 108 via antenna 304, and thereby provision tamper credential 108. In another embodiment, provisioning payload 314 may be associated with provisioning reader 106. Accordingly, computer 306 may deliver provisioning payload 314 via antenna 308 and communicate 312 with tamper credential 108 via antenna 304. Once loaded to tamper credential 108, payload 314 may be stored, modified (e.g., decrypted/encrypted, an indicia of tamper credential 108 added), or otherwise made ready to provision reader 106.

Figure 4:
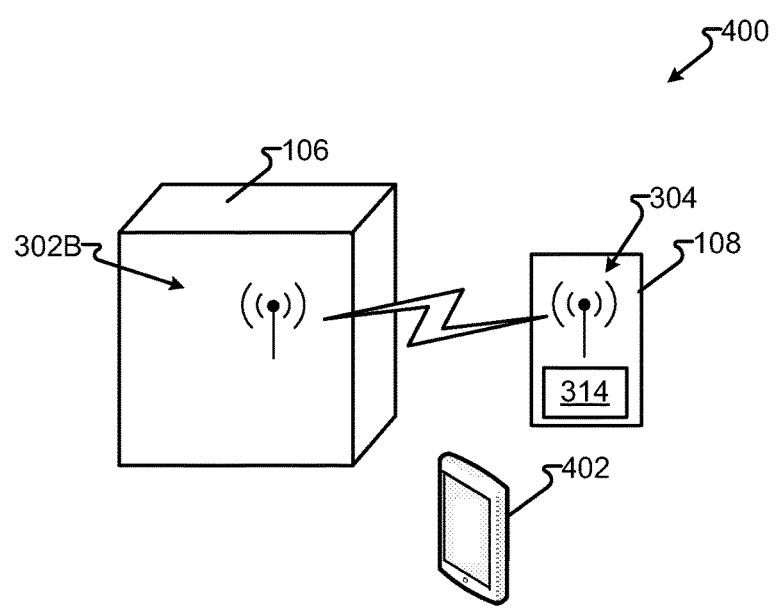
FIG. 4 illustrates a provisioning system whereby a tamper credential provisions a reader in accordance with embodiments of the present disclosure.

With reference now to FIG. 4, provisioning system 400 will be described in accordance with embodiments of the present disclosure. In one embodiment, reader 106 has been installed, or is otherwise powered, enabled antenna 302B is operational and able to transmit and receive signals.

In one embodiment, reader 106 is powered up for the first time since being installed and is in a non-provisioned state. The non-provisioned state may be complete, whereby reader 106 is unable to authenticate any access credential, such as access credential 104. However, the non-provisioned state may be partial, such as when reader 106 contains certain data enabling operation but lacks other data, such as pairing data whereby reader 106 is paired with tamper credential 108.

In one embodiment, reader 106 and temper credential 108 communicate to provision reader 106. Reader 106, having a processor and memory accessible to the processor, signals tamper credential 108. The signal may be an explicit request for provisioning payload 314 or implied (e.g., a first signal from reader 106 received by tamper credential 108). In one embodiment, a processor associated with tamper credential 108 provisions reader 106 with information extracted from provisioning payload 314. In another embodiment, tamper credential 108 delivers provisioning credential 314 to reader 106, whereby a processor associated with reader 106 provisions itself.

While certain embodiments herein describe transmitting provisioning payload 314, it should be noted that various operations may be performed on provisioning payload 314 or portions thereof, such as to ensure validity of the content, the source, and/or the destination, without departing from the teachings provided herein. For example provisioning payload 314 may be modified by tamper credential 108 to include other data, such as an encrypted data element, which may alone or in combination with additional data exchanges, may be used to determine the authenticity of provisioning payload 314. Once provisioned, reader 106 may operate normally.

It should be noted that legitimate removal of reader 106 and/or tamper credentials 108 may be required. Additionally, reader 106 and/or tamper credential 108 may become disabled by an act other than tampering (e.g., accidental damaged caused by a forklift, workers erroneously remove one or more of the reader 106 and/or tamper credential 108, etc.). To place the reader 106 and tamper credential 108 back into service, re-pairing may be required. Authorized device 402 may re-pair reader 106 and tamper credential 108, such as by utilizing a secondary access, such as an administrator access, physical port, remote server, and/or other authorized means.

Figure 5:
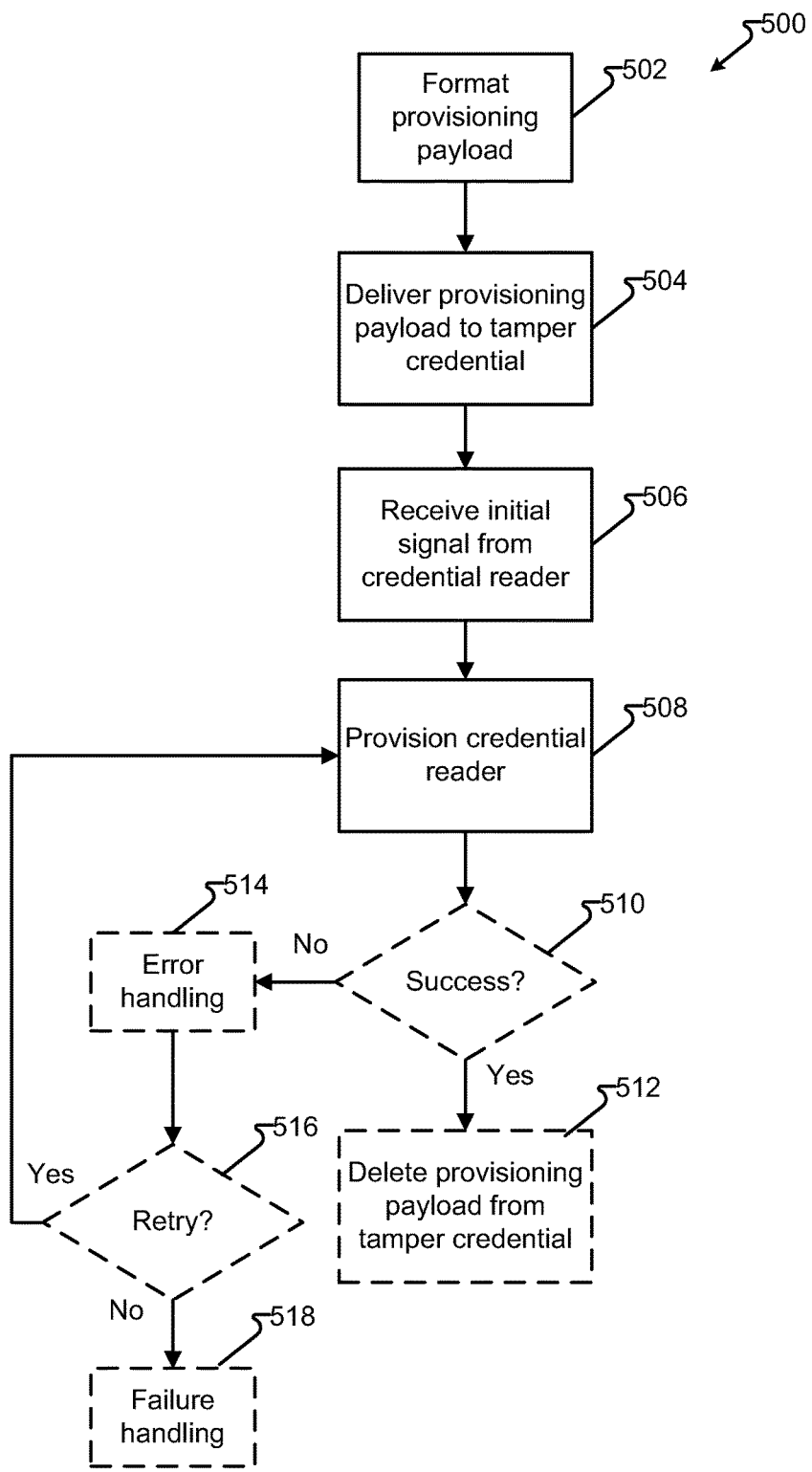
FIG. 5 illustrates a process for provisioning a reader in accordance with embodiments of the present disclosure in accordance with embodiments of the present disclosure.

With reference now to FIG. 5, process 500 will be described for provisioning a reader in accordance with embodiments of the present disclosure. In one embodiment, step 502 formats a provisioning payload, such as provision payload 314. Step 502 may be performed in conjunction with the manufacturing of the reader, such as reader 106, or during installation or other operation prior to being put into service. Step 502 may be performed with data retrieve from provisioning database 310 and delivered by computer 306.

Step 504 delivers the provisioning payload to tamper credential 504. Step 506 receives an initialization signal from the reader. Step 508 provisions the reader. Process 500 may terminate at this point, such as when a single attempt to provision the reader is all that is desired. However, any failure may warrant a repeated attempt. Therefore, step 510 may determine if the provisioning steps were successful. If yes, optionally step 512 may remove the provisioning payload from the tamper credential and process 500 may end. If no, optional step 514 may perform certain error handling operations (e.g., display an error code, signal an operator, "call home" to a computer, etc.). Optional step 516 may determine if a retry should be performed, if yes processing may continue at step 508 or other step as may be determined as a matter of design choice. If no, processing may continue to optional step 518, such as to notify the operator that the installation failed or other operation.

Provisioning reader 106 with provisioning payload 314 stored on tamper credential 106 may be variously embodied. In one embodiment, provisioning payload includes specific data to enable operation of reader 106. For example, the access credentials that will or will be granted access to the asset protected by reader 106. In another embodiment, provisioning payload 314 includes pairing information associated with tamper credential 108, or a plurality thereof and other information to enable communication interface 114. In such an embodiment, additional provisioning information (e.g., identity of the specific access credentials that will or will not be granted access) may be provided at a different time.

Figure 6:
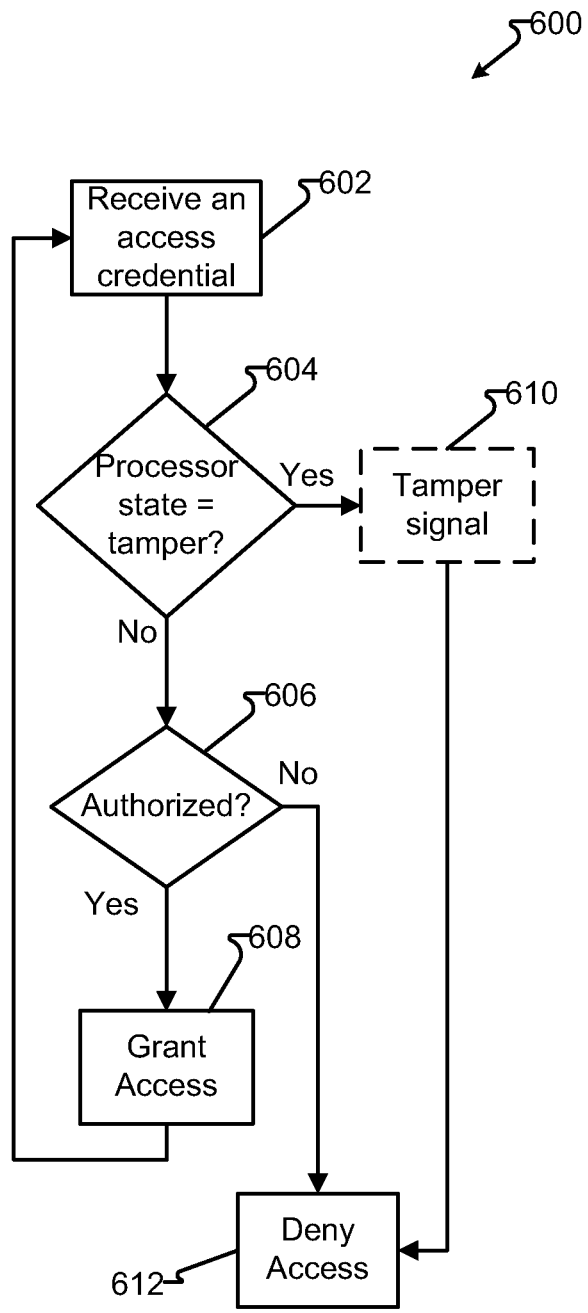
FIG. 6 illustrates a process for operating a reader in accordance with embodiments of the present disclosure in accordance with embodiments of the present disclosure.

With reference now to FIG. 6, process 600 will be described for operating a reader in accordance with embodiments of the present disclosure. In one embodiment, step 602 receives an access credential. Step 602 may be the result of a person placing an access credential within an operational range of the reader, such as reader 106. In other embodiments, step 602 is the result of an access credential with a magnetic strip being swiped on a reader associated with reader 106. In another embodiment, step 602 is the result of personal information (e.g., PIN, password, code, biometric data, etc.) being provided to an associated input device of reader 106. In additional embodiments, two or more of the foregoing may be implemented in step 602.

Step 604 determines if the processor is operating in a tamper state. If step 604 is affirmative, optional step 610 may be performed, such as to create an alarm signal to notify other personnel and/or systems, display the tamper state (e.g., light, marquee message, on-board alarm), or other notification means. Step 612 then denies access to the credential holder associated with presenting the credential in step 602.

If step 604 is false, processing may then continue to step 606 where the credential presented is determined to be authorized or not authorized. If authorized, access may then be granted by step 608 or denied by step 612 if not authorized.

As with other processes described herein, certain additions, deletions, and modifications may be made without departing from the teachings provided. For example, and as described above, the processor when operating in a tamper state may disable reading operations, such as to cause step 602 and/or other steps to be inoperable.

Figure 7:
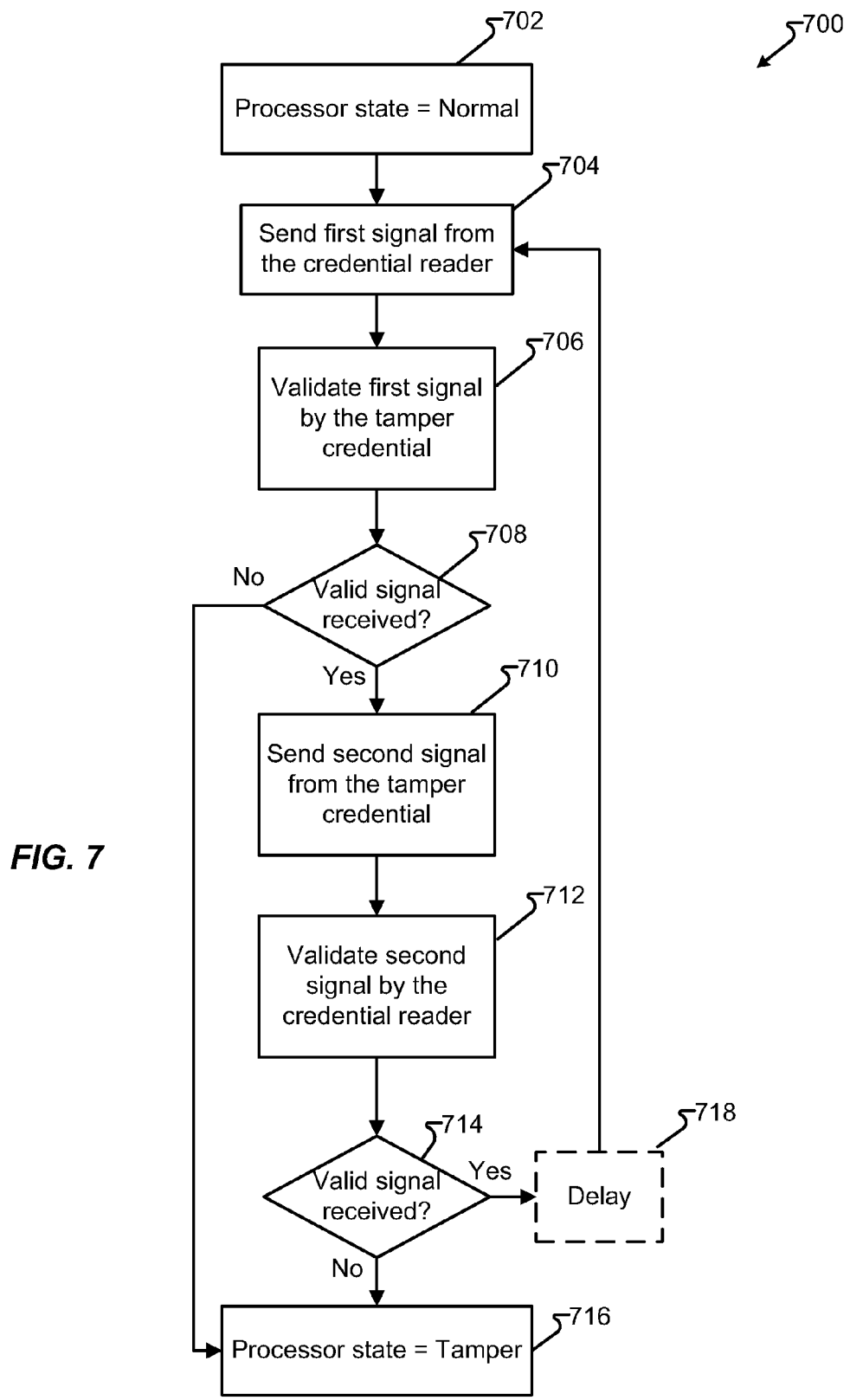
FIG. 7 illustrates a process for operating a reader in accordance with embodiments of the present disclosure in accordance with embodiments of the present disclosure.

With reference now to FIG. 7, process 700 will be described for operating a reader in accordance with embodiments of the present disclosure. In one embodiment, step 702 sets the processor state to normal. In another embodiment, step 702 may set a tamper state to false or other indicator associated with reader, such as reader 106, being in a non-tamper state.

Step 704 sends a first signal from the reader. The intended recipient of the first signal may be a tamper credential, such as tamper credential 108. Step 706 validates the signal by the tamper credential. The specific methodology employed to validate the first signal may be determined as a matter of design choice. In one embodiment, such as a relatively low security environment, the first signal may simply be a trigger or signal to energize an inductive loop of the tamper credential, such as to cause the tamper credential to respond (such as to perform step 710). In such an embodiment, the tamper credential may be limited to determining the presence or absence of a signal and enable only one sided authentication by the reader. In another embodiment, at least some data is provided such that step 706 validates the data of the first signal. The data may be unencrypted, for somewhat more secure implementations, or highly encrypted, for more secure implementations. In still a further embodiment, the delivery of the data within the first signal, performed by step 704, may incorporate several data exchanges between the reader and tamper credential (e.g., challenge-response, public-private encrypted data exchanges, etc.).

Step 708 determines if the first signal is valid and, if yes, step 710 sends a second signal. If step invalid, processing continues to step 716. Step 712 validates the second signal from the tamper credential. As described above with respect to the first signal, the second signal may be variously embodied and the specific embodiment selected, for example, to provide a desired level of security. In one embodiment, the second signal includes identifying an indicia of the tamper credential (e.g., serial number, etc.) which is known to the reader. An otherwise valid signal, but with a different serial number, may be an indication that a bad actor has attempted to substitute a source of false validation information (e.g., a substitute tamper credential) in an effort to keep the reader operational. Similarly, the tamper credential may include an indicia of the reader such that validation step 706 determines if the expected indicia is provided or if the paired reader has been substituted. The indicia may be an unencrypted serial number, encrypted serial number, identifier, shared secret, or other means by which a specific tamper credential may indicate its identify to the reader and, optionally, vice versa. If valid, step 714, is yes and may optionally execute step 718 or process 700 may continue back at step 704. If step 714 is no, processing continues to step 716 whereby a tamper state is set.

In another embodiment, the absence of the first signal would cause step 708 to be determined in the negative and the absence of the second signal would similarly cause step 714 to answer in the negative.

Step 718 may be omitted as a matter of design choice. Certain advantages may be provided by implementing a certain delay, such as to reduce power and/or processing requirements. Step 718 may further implement a "heartbeat" exchange during the delay. For example, steps 704 through 712 may exchange highly encrypted and/or obfuscated data and if successful, step 718 may implement a five second delay and during that delay, exchange a simplified signal once every second. Any disruption in the simplified display may cause step 718 to terminate early and/or trigger another action, which may also include setting the processor state to be in a tamper state. Assuming the appropriate passage of time and the predetermined delay period has expired, processing then continues at step 704 whereby the highly encrypted and/or obfuscated data exchange is repeated.

In addition to setting a processor state to a tamper state, step 716 may be further embodied by setting a processor or memory value or otherwise causing one or more tamper credentials to be place into a tamper state.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A system, comprising:
a reader comprising at least one antenna that facilitates contactless communications with access credentials and a tamper credential when the access credentials or tamper credential are within a predetermined distance of the reader
wherein the tamper credential is paired to the reader at least by having an indicia of the tamper credential maintained in a memory of the reader and wherein the reader and tamper credential communicate when the reader and tamper credential are within the predetermined distance of one other; and
a processor operable to switch the reader to a tamper state upon a failure of the reader to communicate with the tamper credential via the at least one antenna.

2. The system of claim 1, wherein the reader is further operable to grant access to a secured asset upon being presented a valid access credential when not in a tamper state, deny access to the secured asset upon being presented with an invalid access credential, and deny access to the secured asset upon being presented with the valid access credential when in a tamper state.

3. The system of claim 1, wherein the reader is further operable to clear the tamper state upon receiving an authorization signal from a reprogramming device.

4. The system of claim 1, further comprising:
the processor being further operable to determine the failure to communicate with the tamper credential upon the processor determining the that at least one process of a tamper authentication protocol has failed, the processes of the tamper authentication protocol, comprising:
the reader transmitting a first signal;
upon receiving the first signal, the tamper credential transmitting a second signal including a transmitted indicia associated with the tamper credential;
the reader receiving the second signal; and
the reader evaluating the second signal, the evaluating including at least the determination that the transmitted indicia associated with the tamper credential is in accord with the indicia of the tamper credential maintained in the reader.

5. The system of claim 4, whereby the processor is further operable to repeat the tamper authentication protocol.

6. The system of claim 4, wherein:
the tamper credential being paired to the reader, further comprises, an indicia of the reader maintained in a memory associated with the tamper credential; and
the tamper authentication protocol further comprises:
transmitting the first signal, further comprising transmitting the first signal including at least a transmitted indicia associated with the reader; and
upon receiving the first signal, determining by the tamper credential that the transmitted indicia associated with the reader is in accord with the indicia of the reader maintained in memory and, if true, transmitting the second signal.

7. The system of claim 1, wherein the tamper credential comprises at least one of a mechanical and chemical tamper evident structure that, once installed and at least partially removed, causes at least one of a visual indicator, an audible indicator, a smell indicator, a tactile indicator, an alarm signal to security personnel, an alarm signal to a host computer, disabling the memory, and disabling the communication ability of the tamper credential.

8. The system of claim 7, wherein the tamper credential is configured to require the at least partial removal of the tamper credential to facilitate at least one of access the internal components of the reader and removal of the reader from an installed location.

9. The system of claim 1, wherein:
the tamper credential is provisioned with a provisioning payload; and
the tamper credential is further operable to transmit the provisioning payload, the reader is operable receive the provisioning payload, and the processor is further operable to provision the reader with the received provisioning payload.

10. A method, comprising:
situating a reader and a tamper credential in proximity to each other such that, once the reader is powered, each of the reader and tamper credential are operable to communicate with the other via at least one contactless communication interface;
powering the reader;
while the reader is powered, enabling the reader to exchange communications with access credentials via the at least one contactless communication interface;
causing the reader to transmit a first signal to the tamper credential via the at least one contactless communication interface, the first signal comprising at least a transmitted indicia of the reader; and
operating the reader in a tamper state upon the failure of at least one of a number of processes in a tamper authentication protocol, the processes of the tamper authentication protocol comprising:
receiving the first signal by the tamper credential;
accessing, by the tamper credential, an indicia of the reader maintained in a memory of the tamper credential;
determining, by the tamper credential, the first signal includes the transmitted indicia of the reader in accord with the indicia of the reader maintained in the memory of the tamper credential;

transmitting, by the tamper credential, a second signal to the reader, the second signal comprising at least a transmitted indicia of the tamper credential;

upon receiving the second signal, by the reader, accessing a stored indicia of the tamper credential maintained in a memory of the reader; and determining, by the reader, the second signal includes the transmitted indicia of the tamper credential in accord with the indicia of the tamper credential maintained in the memory.

11. The method of claim 10, further comprising, terminating the tamper authentication protocol upon the failure of any one of the at least one of the number of steps in the tamper authentication protocol.

12. The method of claim 10, further comprising, re-executing the tamper authentication protocol.

13. The method of claim 10, further comprising:

provisioning the tamper credential with a provisioning payload;

upon powering of the reader, sending a third signal from the reader to the tamper credential;

upon receiving the third signal, by the tamper credential, transmitting a fourth signal by the tamper credential, the fourth signal based in part on the provisioning payload; and upon receiving the fourth signal, a processor of the reader performing a provisioning operation to provision the reader.

14. The method of claim 13, wherein the third signal is the first signal.

15. An apparatus, comprising:

a processor;

a memory having an indicia of a tamper credential maintained therein; and at least one contactless communication interface that is operated by the processor, the at least one contactless communication interface enabling the processor to communicate with access credentials and a tamper credential when the access credentials or tamper credential are within a predetermined distance of the at least one contactless communication interface; and wherein the processor is operable to cause the at least one contactless communication interface to transmit a first signal;

wherein the at least one contactless communication interface is operable to receive a second signal;

wherein the processor is operable to determine whether the apparatus communicated successfully, as determined by at least the apparatus receiving the second signal and the second signal comprising a received indicia of a tamper credential in accord with the indicia of the tamper credential maintained in the memory; and wherein the processor is operable to switch the reader to a tamper state upon determining the apparatus failed to communicate successfully.

16. The apparatus of claim 15, wherein the at least one contactless communication interface is operable to receive a fourth signal; and wherein the processor is operable to cause a signaling mechanism to indicate authentication upon determining the fourth signal includes an indicia of an authorized accesses credential and the processor is not operating in a tampered state.

17. The apparatus of claim 16, wherein the at least one contactless communication interface is further operable to transmit a third signal designed to solicit the fourth signal.

18. The apparatus of claim 15, wherein the first signal comprises a transmitted indicia of the apparatus.

19. The apparatus of claim 16, wherein the processor is further operable to cause the signaling mechanism to indicate authentication upon determining the fourth signal includes an indicia of a tamper exception authorized access credential and the processor is operating in the tamper state.

20. The apparatus of claim 15, wherein:

the processor is further operable to determine the first signal includes a provisioning payload, the apparatus has not previously been provisioned, and provisioning the apparatus with the provisioning payload.

* * * * *

UNITED STATES PATENT AND TRADEMARK OFFICE
CERTIFICATE OF CORRECTION

PATENT NO. : 9,734,366 B2  
APPLICATION NO. : 14/772901  
DATED : August 15, 2017  
INVENTOR(S) : Randall Dennis Bousfield et al.

Page 1 of 1

It is certified that error appears in the above-identified patent and that said Letters Patent is hereby corrected as shown below:

On the Title Page

Column 1: REPLACE "Michael Lawrence Davis, Austin, TX (US)" with "Masha Leah Davis, Austin, TX (US)"

Signed and Sealed this  
Twenty-sixth Day of September, 2017

Joseph Matal  
*Performing the Functions and Duties of the*  
*Under Secretary of Commerce for Intellectual Property and*  
*Director of the United States Patent and Trademark Office*